United States Patent [19]
Hamami

[11] Patent Number: 5,959,972
[45] Date of Patent: Sep. 28, 1999

[54] METHOD OF PORT/LINK REDUNDANCY IN AN ATM SWITCH

[75] Inventor: Ilan Hamami, Tel Aviv, Israel

[73] Assignee: 3Com Corporation, Santa Clara, Calif.

[21] Appl. No.: 08/863,441

[22] Filed: May 27, 1997

[51] Int. Cl.⁶ .......................... H04L 12/26; H04M 3/24
[52] U.S. Cl. .................... 370/228; 370/244; 370/395
[58] Field of Search .................. 370/216, 217, 370/218, 225, 228, 237, 242, 244, 250, 395, 396, 397, 400; 340/825.01

[56] References Cited

U.S. PATENT DOCUMENTS

| | | | |
|---|---|---|---|
| 5,239,537 | 8/1993 | Sakauchi ................................. | 370/218 |
| 5,398,236 | 3/1995 | Hemmady et al. ..................... | 370/218 |
| 5,420,861 | 5/1995 | De La Bourdonnaye .............. | 370/228 |
| 5,436,886 | 7/1995 | Mcgill ..................................... | 370/219 |
| 5,715,237 | 2/1998 | Akiyoshi ................................. | 370/228 |

FOREIGN PATENT DOCUMENTS

| | | |
|---|---|---|
| 2299914 | 10/1996 | United Kingdom . |
| WO 96/29807 | 9/1996 | WIPO . |

OTHER PUBLICATIONS

Fritz, J., "Bulletproofing ATM: Part I", *Byte*, Jun. 1997, pp. 59–60.

*Primary Examiner*—Chi H. Pham
*Assistant Examiner*—Richy Ngo
*Attorney, Agent, or Firm*—David J. Weitz; Wilson Sonsini Goodrich & Rosati

[57] ABSTRACT

A method for implementing redundancy of both links and ports between two switches, e.g., ATM switches. A redundant link connection between two ATM switches is constructed using two separate parallel communication links connected between separate ports on each of the switches. One communication link is termed the main link and the other is termed the backup link. Two virtual circuits are setup between the backup link ports. One is a direct virtual circuit directed over the backup link. The other is an indirect virtual circuit that is routed over the main link via the main link ports. A virtual circuit is also setup over the main link for regular data traffic. In addition, a standby virtual circuit is setup over the backup link but is placed in standby until the occurrence of a failure. Until a failure occurs, traffic normally proceeds over the main link while the backup link ports transmit keep alive messages to each other over the indirect virtual circuit that is routed over the main link. When the main link fails, either one or both of the backup link ports detects the failure. The data traffic is then switched from the main link to the backup link. The failure is detected by the failure of the backup link ports to receive keep alive messages.

9 Claims, 4 Drawing Sheets

METHOD OF PORT/LINK REDUNDANCY IN AN ATM SWITCH

FIELD OF THE INVENTION

The present invention relates generally to Asynchronous Transfer Mode Switches (ATM) and more particularly relates to a method of providing port and link redundancy in an ATM switch.

BACKGROUND OF THE INVENTION

ATM originated as a telecommunication concept defined by the Comite Consulatif International Telegraphique et Telephonique (CCTI), now known as the International Telecommunications Union (ITU), and the American National Standards Institute (ANSI) for carrying user traffic on any User to Network Interface (UNI) and to facilitate multimedia networking between high speed devices at multi-megabit data rates. ATM is a method for transferring network traffic, including voice, video and data, at high speed. Using this connection oriented switched networking technology centered around a switch, a great number of virtual connections can be supported by multiple applications through the same physical connection. The switching technology enables bandwidth to be dedicated for each application, overcoming the problems that exist in a shared media networking technology, like Ethernet, Token Ring and Fiber Distributed Data Interface (FDDI). ATM allows different types of physical layer technology to share the same higher layer—the ATM layer.

ATM uses very short, fixed length packets called cells. The first five bytes, called the header, of each cell contain the information necessary to deliver the cell to its destination. The cell header also provides the network with the ability to implement congestion control and traffic management mechanisms. The fixed length cells offer smaller and more predictable switching delays as cell switching is less complex than variable length packet switching and can be accomplished in hardware for many cells in parallel. The cell format also allows for multiprotocol transmissions. Since ATM is protocol transparent, the various protocols can be transported at the same time. With ATM, phone, fax, video, data and other information can be transported simultaneously.

The components of the ATM header consist of the following fields. A generic flow control (GFC) field provides flow control; a virtual path identifier (VPI)/virtual channel identifier (VCI) field allows the network to associate a given cell with a given connection; a payload type identifier (PTI) field indicates whether the cell contains user information or management related data and is also used to indicate a network congestion state or for resource management (i.e., the EFCI bit which is part of the PTI field); a cell loss priority (CLP) field indicates that cells with this bit set should be discarded before cells with the CLP bit clear; a header error check (HEC) field is used by the physical layer for detection and correction of bit errors in the cell header and is used for cell delineation.

The provisioning of an ATM network connection may include the specification of a particular class of service. The following list the various classes of service currently defined in ATM. Constant bit rate (CBR) defines a constant cell rate and is used for emulating circuit switching (e.g., telephone, video conferencing, television, etc.). Variable bit rate (VBR) allows cells to be sent at a variable bit rate. Real-time VBR can be used for interactive compressed video and non real-time can be used for multimedia e-mail.

Available bit rate (ABR) is designed for data traffic (e.g., file transfer traffic, etc.) and is the class service connected with resource management. The source is required to control its rate depending on the congestion state of the network. The users are allowed to declare a minimum cell rate, which is guaranteed to the virtual circuit by the network. ABR traffic responds to congestion feedback from the network.

A fourth class of service, unspecified bit rate (UBR), is utilized by data applications that are not sensitive to cell loss or delay and want to use leftover capacity. During congestion, the cells are lost but the sources are not expected to reduce their cell rate.

ATM is a connection oriented transport service. To access the ATM network, a station requests a virtual circuit between itself and other end stations, using the signaling protocol to the ATM switch. ATM provides the User Network Interface (UNI) which is typically used to interconnect an ATM user with an ATM switch that is managed as part of the same network.

Currently, more and more high speed networking applications are utilizing ATM technology. Some of these network applications require very high reliability connectivity between network elements. This connectivity reliability also has a time critical element in that in the event of a connection failure, the recovery mechanism must operate very quickly.

Such connectivity reliability is especially required within a local area network (LAN) environment that utilizes fast communication paths coupled with short response times, as opposed to a wide area network (WAN) environment.

As ATM switches and edge devices are used more frequently today to construct LAN and WAN connectivity via point to point connections (as opposed to bus connections such as Ethernet, Token Ring, FDDI, etc.) it is becoming more and more crucial that ATM entities also support such connectivity reliability.

SUMMARY OF THE INVENTION

The present invention provides a connectivity reliability solution for network elements used to construct LAN and WAN networks using point to point links, such as ATM network elements. More particularly, the present invention discloses a method for implementing redundancy of both links and ports between two switches, e.g., ATM switches. A redundant link connection between two ATM switches is constructed using two separate parallel communication links connected between separate ports on each of the switches. One communication link is termed the main link and the other is termed the backup link. Each communication link is coupled to a separate port located on a separate interface card to further provide port redundancy. Two virtual circuits are setup between the backup link ports. One is a direct virtual circuit directed over the backup link. The other is at indirect virtual circuit that is routed over the main link via the main link ports.

A virtual circuit is also setup over the main link for regular data traffic. In addition, a standby virtual circuit is setup over the backup link but is placed in standby until the occurrence of a failure. Until a failure occurs, traffic normally proceeds over the main link while the backup link ports transmit keep alive messages to each other over the indirect virtual circuit that is routed over the main link.

When the main link fails, either one or both of the backup link ports detects the failure. The data traffic is then switched from the main link to the backup link. The failure is detected by the failure of the backup link ports to receive keep alive messages. The direct virtual circuit is used by both backup link ports to coordinate and synchronize the switch over of traffic from the main link to the backup link.

There is therefore provided in accordance with the present invention a method of establishing a redundant connection between a first network element and a second network element connected by a main link, the main link connected to the first network element and the second network element via a first pair of ports, the method comprising the steps of establishing a backup link separate from the main link between the first network element and the second network element, the backup link connected to the first network element and the second network element via a second pair of ports, establishing a first virtual circuit between the second pair of ports over the main link, the first virtual circuit for carrying keep alive message traffic, establishing a second virtual circuit between the second pair of ports over the backup link, the second virtual circuit for signaling between second pair of ports in the event a failure of the main link occurs, establishing a point to multipoint connection on the first network element and the second network element such that data traffic destined to the first pair of ports is also directed to the second pair of ports, and blocking ingress data traffic received at the second pair of ports until the occurrence of a failure.

The method further comprises the step of detecting a failure of the main link or the first pair of ports when either of the second pair of ports fails to receive the keep alive message traffic. Further, the first network element and the second network element comprise ATM switches.

The method further comprises the step of shutting down the transmitters, until the occurrence of a failure, on the second pair of ports for virtual circuits carrying ingress data traffic duplicated from the first pair of ports and carried over the main link.

There is also provided in accordance with the present invention a method of establishing and putting in service a redundant connection between a first network element and a second network element connected by a main link, the main link connected to the first network element and the second network element via a first pair of ports, the method comprising the steps of establishing a backup link separate from the main link between the first network element and the second network element, the backup link connected to the first network element and the second network element via a second pair of ports, establishing a first virtual circuit between the second pair of ports over the main link, the first virtual circuit for carrying keep alive message traffic, establishing a second virtual circuit between the second pair of ports over the backup link, the second virtual circuit for signaling between the second pair of ports in the event a failure of the main link occurs, establishing a point to multipoint connection on the first network element and the second network element such that data traffic destined to the first pair of ports is also directed to the second pair of ports, blocking ingress data traffic received at the second pair of ports until the occurrence of a failure, detecting a failure of the main link or the first pair of ports when either of the second pair of ports fails to receive the keep alive message traffic, disabling the first pair of ports in the first network element and the second network element, and enabling ingress traffic to proceed over the backup link through the second pair of ports.

The method further comprises the steps of detecting when the main link is restored, returning ingress traffic to the main link upon the restoration of the main link, and placing the backup link in standby mode to again wait for the occurrence of a failure.

BRIEF DESCRIPTION OF THE DRAWINGS

The invention is herein described, by way of example only, with reference to the accompanying drawings, wherein.

DETAILED DESCRIPTION OF THE INVENTION

Figure 1:
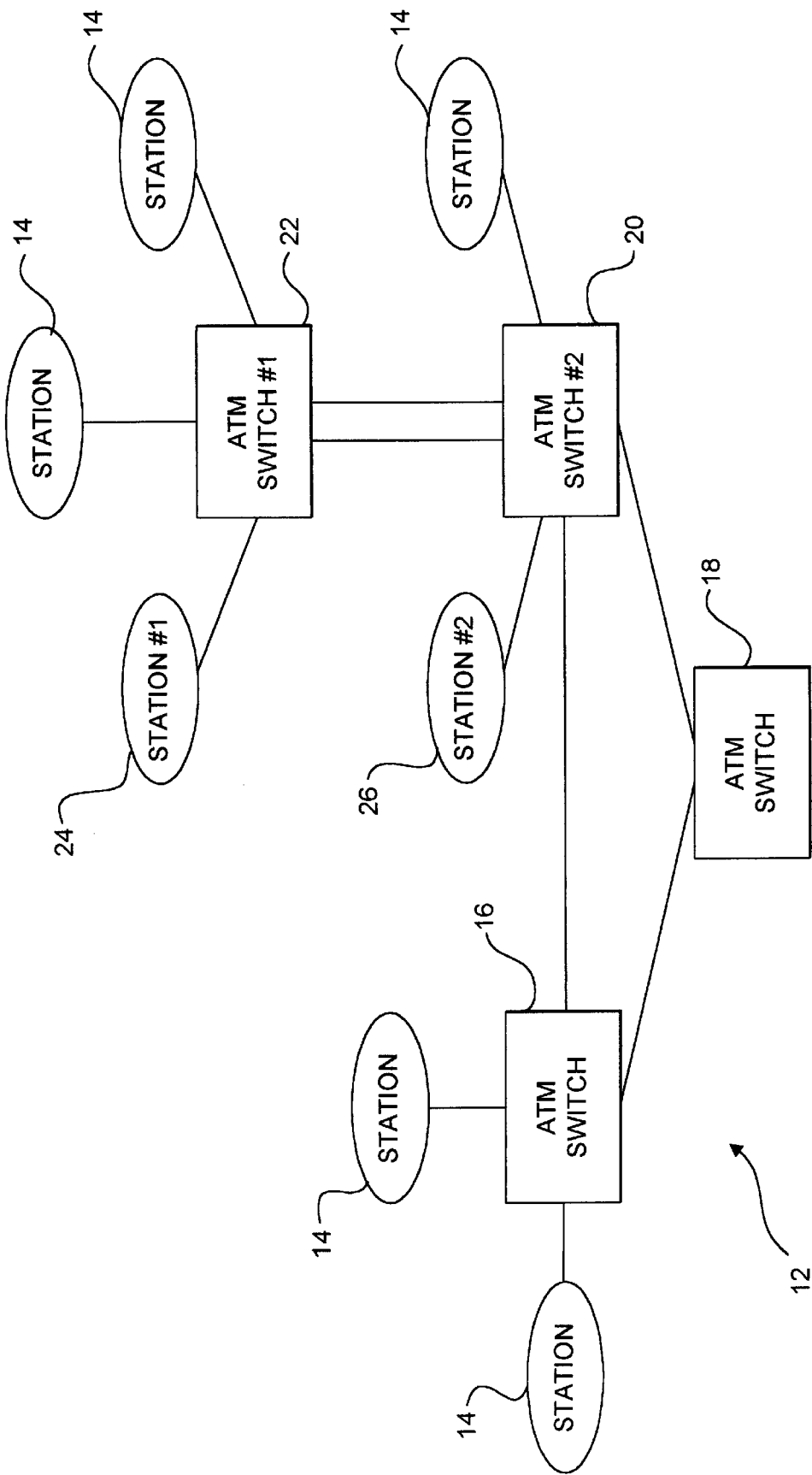
FIG. 1 is a high level block diagram illustrating port and link redundancy between two ATM switches within an ATM switch network.

A high level block diagram illustrating port and link redundancy between two ATM switches within an ATM switch network is shown in FIG. 1. In order to aid in understanding the principles of the present invention, an example ATM network is presented. The use of the following example ATM network, however, in no way limits the scope of the present invention. The method described herein can be utilized with any ATM network wherein separate parallel communication ports and links are available for redundancy purposes. The example ATM network, generally referenced 12, shown in the Figure comprises a plurality of ATM switches 16, 18, 20, 22 and a plurality network elements such as end stations 14, 24, 26. The three ATM switches 16, 18, 20 are shown connected via a single communication link. Two of the ATM switches labeled ATM switch #1 22 and ATM switch #2 20 are shown connected by two separate parallel communication links. In accordance with the present invention, one of the links is termed the main link and the other the backup link. In addition, two of the stations, station #1 24 and station #2 26 are shown connected to ATM switch #1 and ATM switch #2, respectively. For illustration purposes, a circuit is set up between station #1 and station #2 in order to permit communication therebetween.

Under normal operating conditions, traffic is sent between switch #1 and switch #2 via the main link. The backup link remains relatively idle ready for use in the event the main link fails. According to the present invention, when a failure occurs on the main link or either of the two ports on either side of the main link, the traffic originally traveling over the main link is switched to the backup link. The switch over occurs automatically and relatively quickly. When the main link is restored, the traffic is then switched back to the main link and the backup link and associated ports are put into standby mode once again.

The present invention utilizes separate parallel communication links and ports in combination with the multipoint capability of the ATM switch to provide redundancy between two ATM switches. It is noted that the redundancy is provided within the ATM layer itself without the need for higher order layers.

Figure 2:
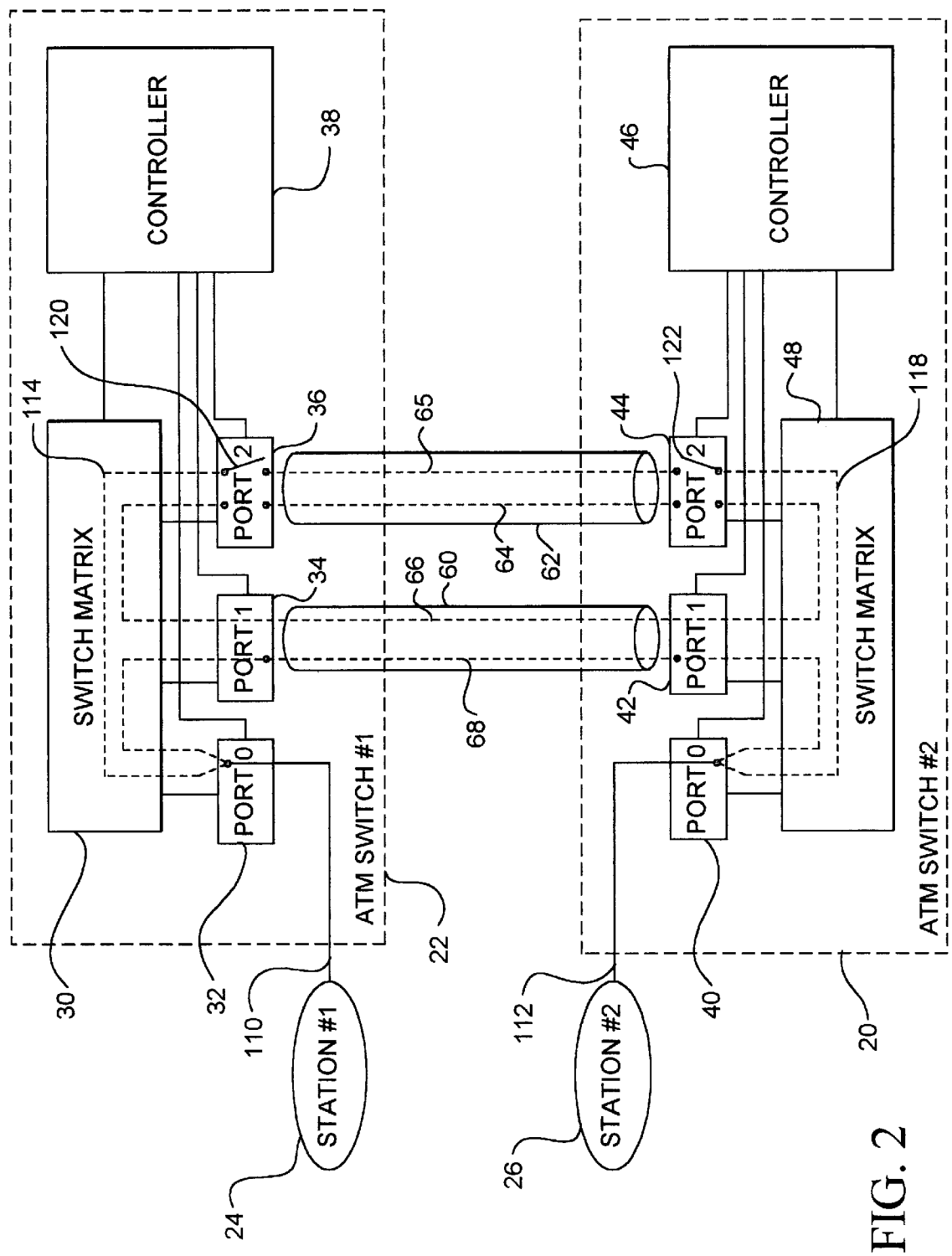
FIG. 2 is a high level block diagram illustrating a main link and a backup link established between two ATM switches for providing redundancy in the event of either a port failure or a link failure.

A high level block diagram illustrating a main link and a backup link established between two ATM switches for providing redundancy in the event of either a port failure or a link failure is shown in FIG. 2. This Figure illustrates a portion of the ATM network of FIG. 1 in more detail. Shown in more detail are ATM switch #1 22 and ATM switch #2 20 and their connections to station #1 24 and station #2, respectively. ATM switch #1 22 comprises a switch matrix 30, a plurality of ports of which only three are shown for clarity sake: port #0 32, port #1 34, port #2 36 and a controller 38. Station #1 is connected to port #0 on ATM switch #1 via port connection 110.

Similarly, ATM switch #2 20 comprises a switch matrix 48, a plurality of ports of which only three are shown for clarity: port #0 40, port #1 42, port #2 44 and a controller 46. Station #2 is connected to port #0 on ATM switch #2. Two communication links connect switch #1 with switch #2 via port connection 112.

The redundancy method of the present invention requires that the two switches be connected by at least two parallel communication links to two separate ports. In addition, each port should be located on separate port interface cards so that a failure in one of the interface cards does not disrupt communications over both links. Port #1 on switch #1 is connected to port #1 on switch.#2 via the communication link 60. Port #1 on both switch #1 and switch #2 are called main link ports and the communication link 60 is called the main link. Port #2 on switch #1 is connected to port #2 on switch #2 via the communication link 62. Port #2 on both switch #1 and switch #2 are called backup link ports and the communication link 62 is called the backup link.

The switch matrix in both switches provides the switching functionality for the virtual circuits set up by the controller. The controller functions to setup and tear down virtual paths and virtual circuits between the different ports. The switch matrix provides standard switching functionality that is commonly found in ATM switches currently commercially available and well known in the art. Thus a detailed description of the operation of the switch matrix will not be presented herein.

The method of the present invention comprises two phases. The first phase is the setting up of the virtual circuits between the two switches at call establishment time. It is at this time that the redundancy mechanism is put into place. The second phase occurs when a failure is detected. Each phase will be described in turn.

Figure 3:
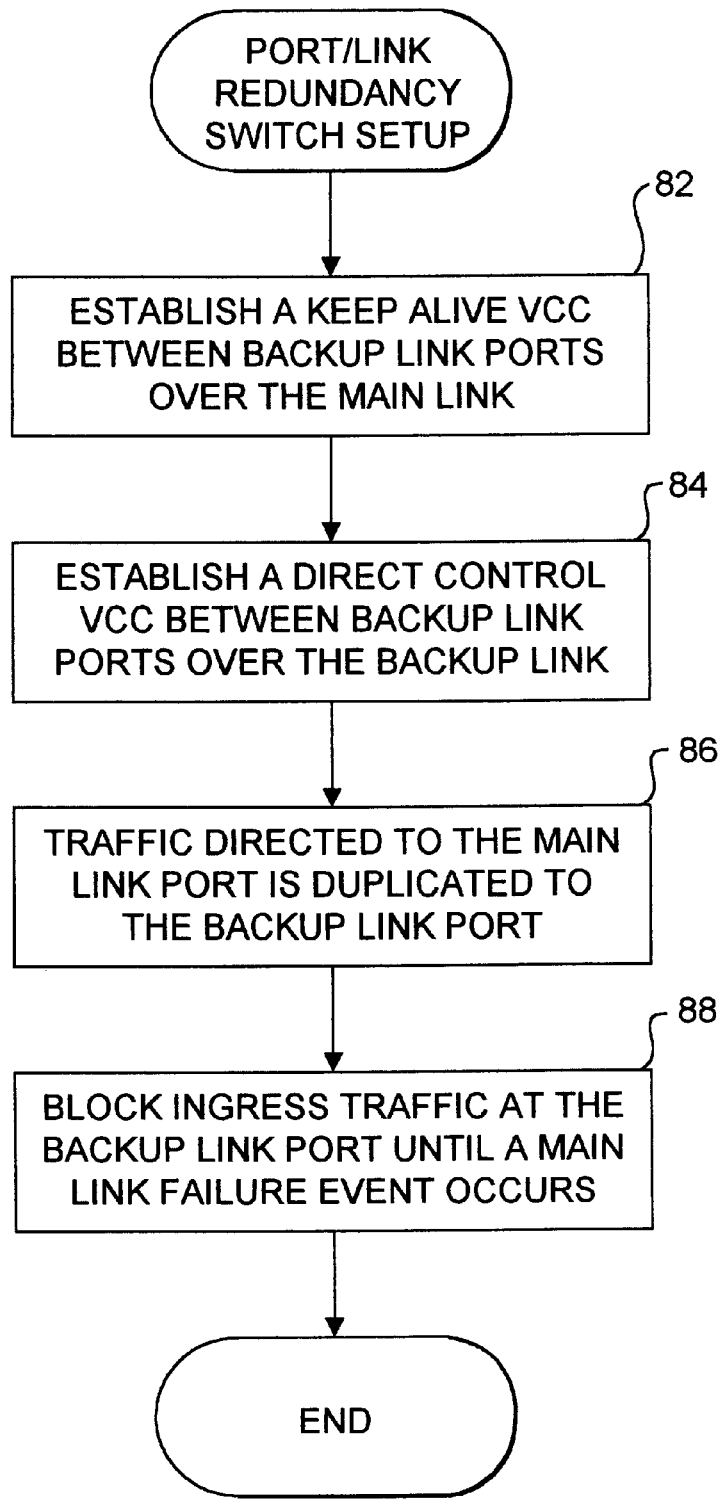
FIG. 3 is a high level flow diagram illustrating the setup phase for establishing port/link redundancy between two ATM switches.

A high level flow diagram illustrating the setup phase for establishing port/link redundancy between two ATM switches is shown in FIG. 3. It is assumed that a point to multipoint connection has already been establishing connecting station #1 with station #2. A virtual circuit is established between station #1 and station #2 via virtual circuit 68. This virtual circuit is routed from port #0 to port #1 in switch #1, over the main link 60 and through port #1 and port #0 in switch #2 to station #2. In switch #1, a virtual circuit is also established between station #1 and port #2, represented by dashed line 114. Similarly, in switch #2, a virtual circuit is also established between station #1 and port #2, represented by dashed line 118. Absent a failure, traffic normally flows from station #1 to station #2 over virtual circuit 68. When a failure occurs, the traffic is switched to flow over paths 114, 65 and 118 via port #2 of switches #1 and #2. For illustration purposes only, port #2 36 is shown comprising a single pole single throw switch 120 and port #2 44 is shown comprising a single pole single throw switch 122. Switches 120, 122 are closed to complete the virtual circuit between stations #1 and #2 in response to a failure of the main link 60, With reference to FIGS. 2 and 3, the first step in the setup process is to establish a keep alive virtual circuit between the backup link ports, i.e., ports #2 on switches #1 and #2, over the main link (step 82). This keep alive virtual circuit is represented in FIG. 2 as the dashed line 66 connecting port #2 on switch #1 to port #2 on switch #2 that passes through the switch matrix 30, port #1 34, the main link 60, port #1 42 and the switch matrix 48.

A direct control virtual circuit, represented by the dashed line 64, is then established between the backup link ports over the backup link (step 84). All traffic directed to the main link port is duplicated to the backup link port (step 86). Any data traffic that is directed to the main link port by the call control software is also directed to the backup link port using the multicast capability of the switch. Note that although the duplication process is performed by the switch, the initiating command is sent from the port itself Any virtual circuit that is established through the main link port is also established through the backup link port using the standard mechanism of establishing point to multipoint connections. It is important to note that a point to multipoint connection is established by the call control software in the controller regardless of whether the call has specifically requested it or not Once he virtual circuits have been established, all ingress traffic at the backup link port is blocked until a main link failure event occurs (step 88). Optionally, the outgoing, i.e., Tx, data traffic on the virtual circuits that are on standby until a failure occurs can be shut down to reduce the power consumption of the switch. The Tx of these virtual circuits can be shut down since the receiver on the other end of the link has been instructed to ignore any data traffic received. It is important to distinguish between data traffic and the traffic required to implement port/link redundancy. The transmitters only for the virtual circuits carrying data traffic, as opposed to keep alive messages, are shut down since the receivers ignore received data in any event while the virtual circuit is in standby.

The keep alive virtual circuit is used to detect the occurrence of a failure of the main link or either of its ports. The keep alive virtual circuit must be switched through the main link ports at both network elements, i.e., ports #1 34, 42. This virtual circuit is used to exchange information, e.g., keep alive messages on a periodic basis between both backup link ports. The rate of exchange of the keep alive messages is the major determining factor of how quickly a failure of the main link can be detected. Thus, the rate of exchange of keep alive messages directly influences the switch over rate from the failed main link to the backup link. The failure of the main link is detected when one or both of the backup link ports fail to receive a keep alive message from its peer backup link port. Note that the keep alive messages can originate from any suitable portion of the switch such as from the backup link port itself or from the control software in the controller.

As stated previously, the direct control virtual circuit, established between both peer backup link ports of both switches or network elements. This virtual circuit is termed 'direct' since it does not pass through the main link ports. This virtual circuit is used to signal the other peer backup link port of a failure of the main link. Even if both ports detect the failure, the one to detect the failure first signals the other. This ensures that both switches are informed about the main link failure event even if only one of the switches detects it. The direct control virtual circuit can also be used to synchronize the switch over from the link to the backup link if such a synchronization is required for a particular switch.

Figure 4:
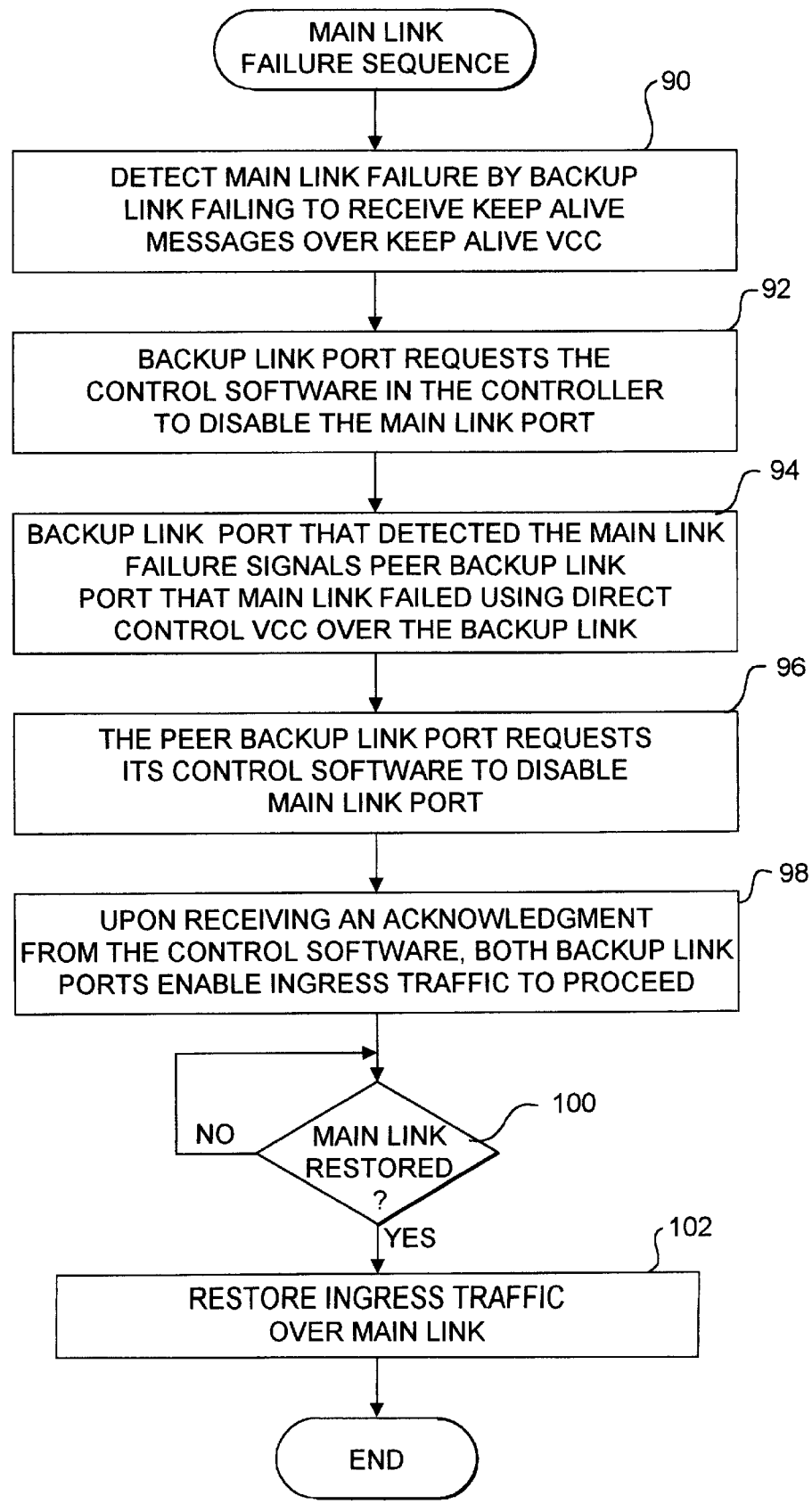
FIG. 4 is a high level flow diagram illustrating the failure sequence performed by the ATM switches in the event of a port or link failure.

The failure sequence will now be described in more detail. A high level flow diagram illustrating the failure sequence performed by the ATM switches in the event of a port or link failure is shown in FIG. 4. As described earlier, one or both of the backup link ports detects a main link failure event when keep alive messages cease to be received (step 90). The backup link port that detected the failure then requests the control software in the controller to disable the main link port (step 92). In addition, the backup link port informs its peer about the main link failure event via the direct control virtual circuit (step 94). In response, the peer backup link port requests its control software to disable its main link port (step 96).

Upon receiving an acknowledgment from the control software, both backup link ports enable ingress traffic to proceed over the backup link (step 98). With reference to the example in FIG. 2, it is during this step, the 'switches' 120, 122 in ports #2 are closed to complete the virtual circuit between stations #1 and #2 via paths 114, 65 and 118. The acknowledgment comprises a confirmation that the main link ports were disabled and the backup link ports enabled for ingress traffic. In addition, the egress transmitters for the virtual circuits on both backup link ports are turned on if they were turned off previously. When the main link is restored (step 100), the ingress traffic is returned to the main link and the backup link is placed in standby mode again to wait for the occurrence of a failure (step to 102).

Using this mechanism of the present invention, switch over times of fractions of a second are obtainable if the keep alive messages are sent often enough. The switch over times are also dependent on the length of the processing delays in the system and the communication delays between the control software the main and backup link ports. Further, the method described herein does not require the use or involvement of higher and more sophisticated applications such as PNNI, IISP, SIG, ILMI, etc. Note that it would be obvious to one skilled in the art to utilize an entity other than the control software to implement the switching of traffic between the main link and the backup link.

While the invention has been described with respect to a limited number of embodiments, it will be appreciated that many variations, modifications and other applications of the invention may be made.

What is claimed is:

1. A method of establishing a redundant connection between a first network element and a second network element connected by a main link, said main link connected to said first network element and said second network element via a first pair of ports whereby a first virtual circuit is established thereover, said first pair of ports including receiving means and transmitting means, said method comprising the steps of:

establishing a backup link separate from said main link between said first network element and said second network element, said backup link connected to said first network element and said second network element via a second pair of ports whereby a second virtual circuit is established thereover, said second pair of ports including receiving means and transmitting means;

establishing a third virtual circuit between said second pair of ports over said main link and not over said backup link, said third virtual circuit for carrying keep alive message traffic that is transmitted on a periodic basis between said first network element and said second network element, the failure to receive said keep alive traffic indicating that said main link has failed;

establishing a point to multipoint connection on said first network element and said second network element such that data traffic destined to said first pair of ports is also directed to said second pair of ports; and blocking ingress data traffic received at said second pair of ports until the occurrence of a failure.

2. The method according to claim 1, further comprising the step of detecting a failure of said main link or said first pair of ports when either of said second pair of ports fails to receive said keep alive message traffic.

3. The method according to claim 1, wherein said first network element and said second network element comprise ATM switches.

4. The method according to claim 1, further comprising the step of shutting down said transmitting means on said second pair of ports, until the occurrence of a failure, for virtual circuits carrying ingress data traffic duplicated from said first pair of ports and carried over said main link.

5. A method of establishing and putting in service a redundant connection between a first network element and a second network element connected by a main link, said main link connected to said first network element and said second network element via a first pair of ports whereby a first virtual circuit is established thereover, said first pair of ports including receiving means and transmitting means, said method comprising the steps of:

establishing a backup link separate from said main link between said first network element and said second network element, said backup link connected to said first network element and said second network element via a second pair of ports whereby a second virtual circuit is established thereover, said second pair of ports including receiving means and transmitting means;

establishing a third virtual circuit between said second pair of ports over said main link and not over said backup link, said third virtual circuit for carrying keep alive message traffic that is transmitted on a periodic basis between said first network element and said second network element, the failure to receive said keep alive traffic indicating that said main link has failed;

establishing a point to multipoint connection on said first network element and said second network element such that data traffic destined to said first pair of ports is also directed to said second pair of ports;

blocking ingress data traffic received at said second pair of ports until the occurrence of a failure;

detecting a failure of said main link or said first pair of ports when either of said second pair of ports fails to receive said keep alive messages;

disabling said first pair of ports in said first network element and said second network element; and enabling ingress traffic to proceed over said backup link through said second pair of ports in response to the occurrence of a failure.

6. The method according to claim 5, further comprising the steps of:

detecting when said main link is restored;

returning ingress traffic from said backup link to said main link upon the restoration of said main link; and blocking ingress data traffic received at said second pair of ports until the next occurrence of a failure.

7. The method according to claim 5, wherein said first network element and said second network element comprise ATM switches.

8. The method according to claim 1, further comprising the step of establishing a fourth virtual circuit between said second pair of ports over said backup link, said fourth virtual circuit for signaling between second pair of ports in the event a failure of said main link occurs.

9. The method according to claim 5, further comprising establishing a fourth virtual circuit between said second pair of ports over said backup link, said fourth virtual circuit for signaling between said second pair of ports in the event a failure of said main link occurs.

* * * * *